No. 755,112. PATENTED MAR. 22, 1904.
J. CUNNING.
MOLD FOR MARKING MEAT PRODUCTS.
APPLICATION FILED OCT. 25, 1902.
NO MODEL.
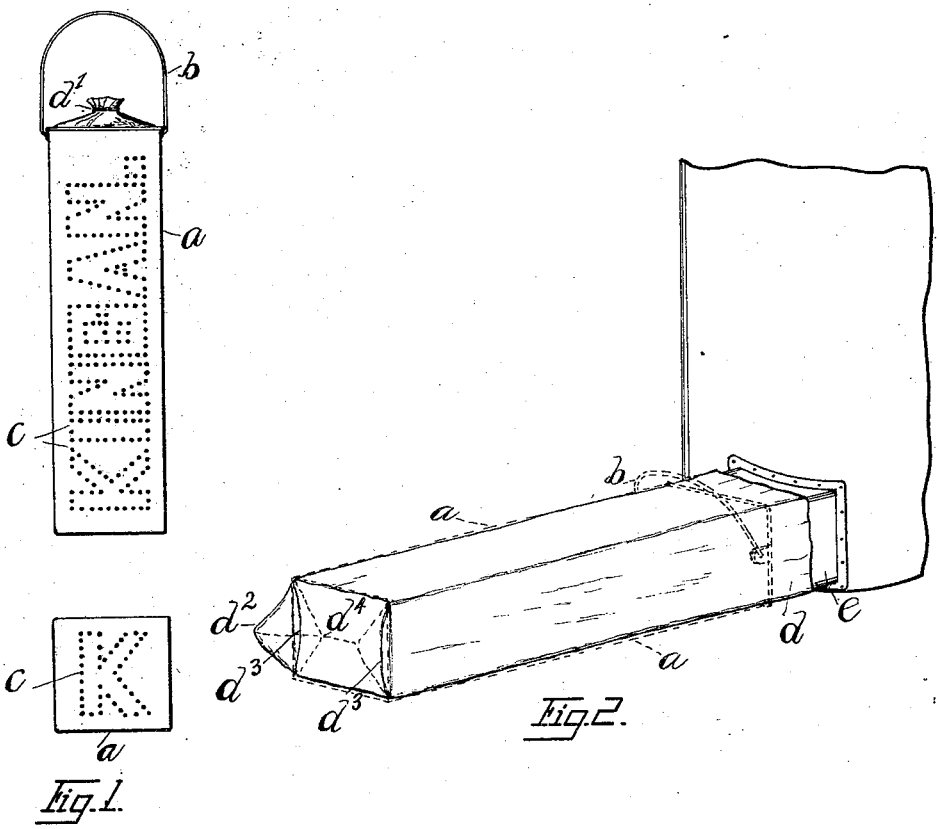

No. 755,112. Patented March 22, 1904.

UNITED STATES PATENT OFFICE.

JAMES CUNNING, OF INDIANAPOLIS, INDIANA.

MOLD FOR MARKING MEAT PRODUCTS.

SPECIFICATION forming part of Letters Patent No. 755,112, dated March 22, 1904.

Application filed October 25, 1902. Serial No. 128,767. (No model.)

*To all whom it may concern:*

Be it known that I, JAMES CUNNING, a citizen of the United States, residing at Indianapolis, in the county of Marion and State of Indiana, have invented certain new and useful Improvements in Devices for Molding and Marking Prepared-Meat Products, set forth in the following specification.

My invention relates to molds more especially for veal-loaf or other reduced ground or prepared meats, and has for its objects the giving of certain form to a flexible or textile casing containing the meats, which would otherwise naturally conform to a round figure in cross-section, due to the compressing force of customary devices employed for filling such casing-sacks.

Another object is to perforate the walls of this molding device, so as to facilitate drainage and ventilation in the process of curing.

Another object is to so arrange the said perforations or stencil that they will represent some brand or mark in letters, characters, or name characteristic of the goods, manufacture, or class for purposes of advertisement and designation of goods packed in this manner, as since in the process of curing the surfaces of the casing exposed by such perforations or figure in stencil cut in the walls of said mold are subjected in a measure so differently from parts not so exposed as to become marked plainly by discolorations conforming with such perforations, figure, or stencil, effecting a permanent imprint useful in designation of the goods.

Another object is the forming of the mold so that the packages molded may be more closely packed in storage or for shipping than is possible in the ordinary round form, requiring twenty per cent. less space than the latter.

I attain these objects by means and in the manner described in the following specification and accompanying drawings, in the different views of which similar characters of reference refer to similar parts.

In the drawings, Figure 1 shows side and end views of a mold shown as square in cross-section, which is the preferable form, though it may be of any suitable form and is shown as containing a casing-sack filled and molded preparatory for curing or removal. Fig. 2 represents a perspective view of the nozzle of the stuffer or filler employed to fill the casing-sacks with the casing-sack applied thereon preparatory to having a mold placed over it for filling.

In letters of reference $a$ represents my mold made of any suitable material—in this case of sheet metal formed in rectangular shape—and may be square or oblong in cross-section, preferably the former.

$b$ is a bail whereby to suspend the mold when filled for the purpose of curing, drainage, and smoke-curing or drying preparatory to removal from the mold.

$c$ represents the perforations in the walls of the mold disposed so as to represent signs, figures, letters, or words.

$d$ shows the casing-sack.

$e$ represents the filling-nozzle, of a suitable exterior shape to give form to the casing-sack when placed on it, the corners $d^2$ being tucked under a fold readily formed, as at $d^3$, to a point at $d^4$, so the casing-sack assumes a full square form when the mold is placed over it and filled in the ordinary manner and removed and tied, as at $d'$, when it is complete for the process of curing. When the curing is effected, the imprint of stencil or perforations then being plainly depicted, the mold, with its contents, is preferably placed in cooling-room for a short time, when the casing, with its contents, is readily removed from the mold, being then ready for the market, retaining the form of the mold and being on account of its own form readily distinguished from similar goods on the market, this constituting also a characteristic shape or form for the product valuable as an advertising feature. There being numerous methods of curing and pickling as to preparations employed in liquid form and in many instances where the smoking process is employed in addition to the liquids for curing and in all instances in the curing process of whatever nature the chemical action is such as to fix a permanent imprint on portions of the fabric of the casing exposed through the character or figures cut through the walls of the mold, so that the product is very plainly marked as a natural result, requiring no additional materials or labor to so mark said product.

I have shown my invention as a mold quadrangular in form and rectangular in cross-section and a one-piece mold; but the angles could be varied and the sides perforated differently, or the mold could be made in parts instead of integral, and a number of slight changes could be resorted to without departing from my invention, and I desire it understood that I hold myself at liberty to make any such changes as fall fairly within the scope of my invention, and

What I claim as new, and desire to secure by Letters Patent, is—

1. In a device for molding and marking prepared-meat products, an oblong mold preferably four-sided, and open at one end, a removable casing adapted when filled within the said mold with said products to conform closely to the walls of said mold and having perforations through the walls of said mold to facilitate drainage, drying and smoking, and thereby causing an effective marking upon those portions of the casing exposed by said perforations.

2. In a device for molding and marking prepared-meat products, an oblong mold preferably four-sided and open at one end, a removable casing adapted when filled with said products within the said mold to conform closely to the walls of said mold, and having perforations through the walls of said mold to facilitate drainage, drying and smoking and thereby causing marking upon those portions of the external surface of said casing exposed by said perforations, effective as distinguishing marks useful in commerce, and a bail by which to suspend the mold during the drainage drying and smoking process.

Signed at Indianapolis, Indiana, this 13th day of September, 1902.

JAMES CUNNING.

Witnesses:
JUSTUS H. ADAMS,
DAVID W. ORMORD.